United States Patent
Fallon et al.

(10) Patent No.: US 9,658,806 B2
(45) Date of Patent: May 23, 2017

(54) DRIVERLESS PRINTING BY A TARGET PRINTER

(75) Inventors: Michael F. Fallon, Tiverton, RI (US); Myles Wilde, Charlestown, MD (US); Matthew J. Adiletta, Bolton, MD (US); Dave Hillyard, Phoenix, AZ (US); Yuh-Lin E. Chang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,583

(22) PCT Filed: Dec. 16, 2011

(86) PCT No.: PCT/US2011/065342
§ 371 (c)(1),
(2), (4) Date: Mar. 10, 2014

(87) PCT Pub. No.: WO2013/089763
PCT Pub. Date: Jun. 20, 2013

(65) Prior Publication Data
US 2014/0211228 A1 Jul. 31, 2014

(51) Int. Cl.
*G06F 3/12* (2006.01)
*G06F 9/44* (2006.01)

(52) U.S. Cl.
CPC ............ *G06F 3/1247* (2013.01); *G06F 3/123* (2013.01); *G06F 3/1204* (2013.01); *G06F 3/1206* (2013.01); *G06F 3/129* (2013.01); *G06F 3/1225* (2013.01); *G06F 3/1228* (2013.01); *G06F 3/1244* (2013.01); *G06F 9/4411* (2013.01)

(58) Field of Classification Search
None
See application file for complete search history.

(56) References Cited

U.S. PATENT DOCUMENTS

| | | | |
|---|---|---|---|
| 2002/0186393 A1 | 12/2002 | Pochuev et al. | |
| 2004/0223182 A1* | 11/2004 | Minagawa | 358/1.15 |
| 2007/0177192 A1 | 8/2007 | Wang | |
| 2008/0130051 A1* | 6/2008 | Lawrence et al. | 358/1.15 |
| 2008/0231886 A1 | 9/2008 | Wehner et al. | |

(Continued)

FOREIGN PATENT DOCUMENTS

| | | |
|---|---|---|
| TW | 200713006 A | 4/2007 |
| WO | 2013/089763 A1 | 6/2013 |

OTHER PUBLICATIONS

Office Action received for Taiwan Patent Application No. 101147205, mailed on Oct. 23, 2014, 10 pages of English translation only.

(Continued)

*Primary Examiner* — John Wallace
(74) *Attorney, Agent, or Firm* — Jordan IP Law, LLC

(57) ABSTRACT

Systems and methods of operating a computing system may involve providing a native format driver to a print client in order to print a document. In one example, a print document communication including a print document in native format may be transmitted to the target printer, and the print document may be converted from the native format to a target printer format at the target printer.

29 Claims, 2 Drawing Sheets

(56) References Cited

U.S. PATENT DOCUMENTS

| | | | |
|---|---|---|---|
| 2008/0256438 A1* | 10/2008 | Harman | G06F 17/30569 715/239 |
| 2010/0002253 A1* | 1/2010 | Kim | G06F 3/1204 358/1.15 |
| 2010/0033762 A1* | 2/2010 | Mickeleit | 358/1.15 |
| 2011/0194123 A1 | 8/2011 | Sweet et al. | |
| 2011/0225581 A1* | 9/2011 | Cho et al. | 717/178 |
| 2011/0238784 A1* | 9/2011 | Takazawa | H04N 1/00344 709/217 |
| 2011/0249278 A1* | 10/2011 | Yamazaki | G03G 15/5033 358/1.2 |
| 2012/0268777 A1* | 10/2012 | Fry | G06F 3/1218 358/1.15 |

OTHER PUBLICATIONS

International Search Report and Written Opinion received for PCT Application No. PCT/US2011/065342, mailed on Aug. 27, 2012, 11 pages.
International Preliminary Report on Patentability and Written Opinion received for PCT Patent Application No. PCT/US2011/065342, mailed on Jun. 26, 2014, 8 pages.

* cited by examiner

1000

DRIVERLESS PRINTING BY A TARGET PRINTER

BACKGROUND

Technical Field

Embodiments generally relate to processing print requests. More particularly, embodiments relate, to utilizing a target printer to acquire a driver to process a print request.

Discussion

Typically, a driver may be used to translate commands from a client device (e.g., a notebook computer) to a command understood by a target device (e.g., a printer). In order to complete a print request from client device, a printer driver may be installed on the client device. A client device user may not know, however, where to find that particular printer driver, or how to install it.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve a computer implemented method including determining that a driver for a target printer is not installed on a print client, transmitting a request communication to the target printer, transmitting a return communication including a document acquisition driver to the print client. The method may also provide for transmitting a print document communication including a print document in a native format to the target primer, and conducting a conversion of the print document from the native form at to as target printer format.

Embodiments can also involve a computer readable storage medium including a set of instructions, which, it executed by a processor, cause a computer to determine that a driver for a target printer is not installed on a print client, transmit a request communication to the target printer, receive a return communication including a document acquisition driver to the print client. The instructions may also cause a computer to transmit a print document communication including a print document in a native format to the target printer.

Embodiments can also involve a computer readable storage medium including a set of instructions, which, if executed by a processor, cause a computer to receive a request communication, transmit a return communication including a document acquisition driver to a print client, receive a print document communication including a print document in a native format. The instructions May also cause a computer to conducting a conversion of the print document from the native format to a target printer format.

Other embodiments can involve a system including a client processing component, a client memory device including a client-side pinning application having a set of instructions to be executed by the client processing component, a printer processing component, and a processor memory device including a printer-side printing application having a set of instructions to be executed by the printer processing component. The client-side printing application and the printer-side printing application may be configured to transfer a request communication from a print client to a target printer in response to a determination that a driver for the target printer is not installed on the print client, and transfer a return communication from the target printer to the print client, the return communication to include a document acquisition driver. The client-side printing application and the printer-side printing application ma also be configured to transfer a print document communication from the print client to the target printer, the print document communication to include a print document in a native format.

Figure 1:
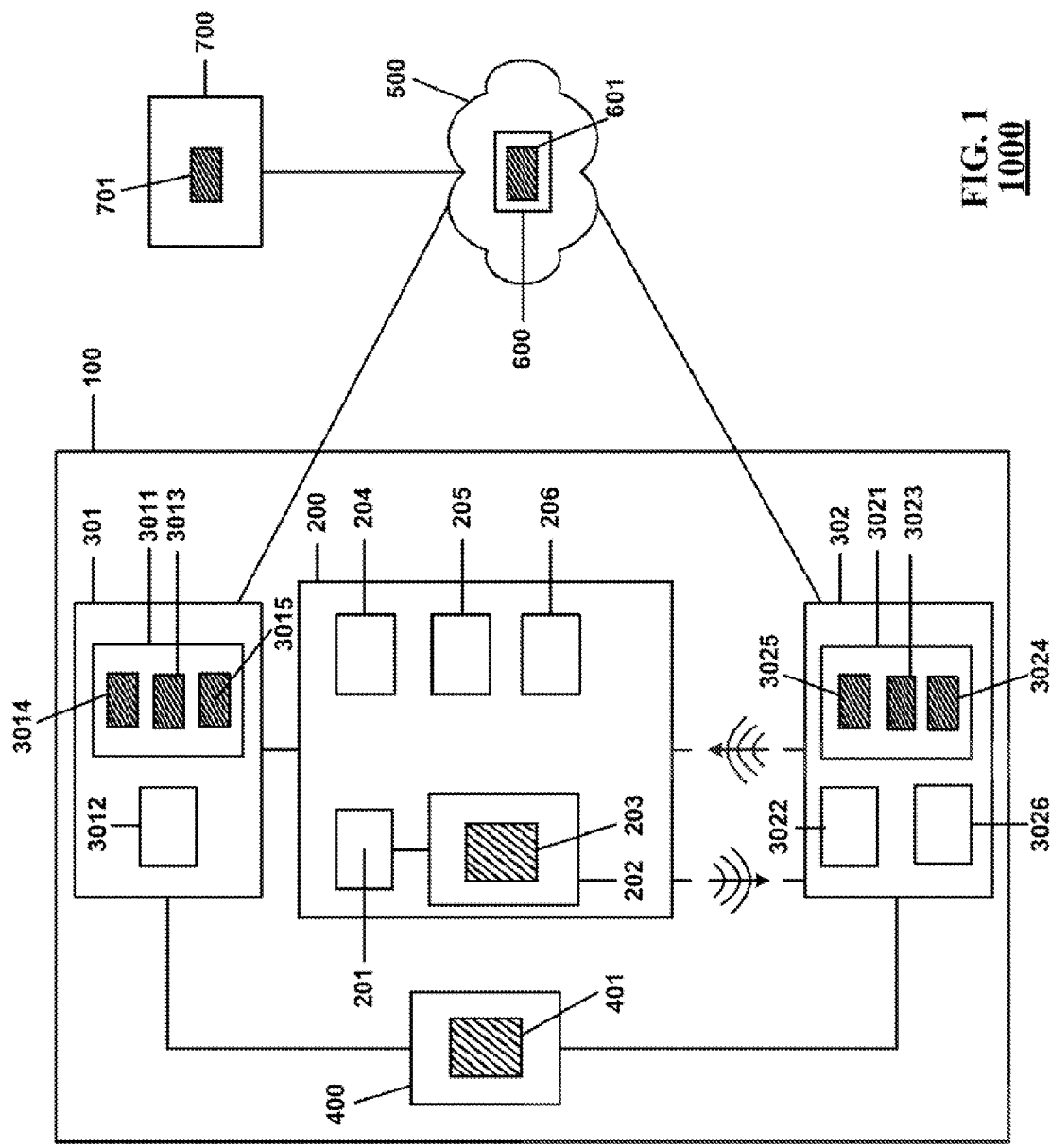
FIG. 1 is a block diagram of an example of a computer system that utilizes a target printer to acquire a driver to process a print request in accordance with an embodiment of the invention.

Turning now to FIG. 1, a block diagram of a computer system 1000 that utilizes a target printer to acquire a driver to process a print request is shown. A client network 100 may include a print client 200, printers 301, 302, and a network database 400, and the client network 100 may be coupled to the Internet 500 and an OEM (Original Equipment Manufacturer) database 700.

The client network 100 may be a personal area network (PAN), local area network (LAN), wireless network, wide area network (WAN), storage area network (SAN), virtual private network (VPN) or any similar collection of interconnected computer devices that facilitate communication and transmit among the interconnected computer devices. In the embodiment illustrated in FIG. 1, the client network 100 is a LAN.

The print client 200 may be any electronic device capable of directing a print request. For example the print client 200 may be a mobile device (e.g., a mobile/smart phone, a personal digital assistant, a tablet device), a laptop/notebook computer, or a desktop computer. In the embodiment illustrated in FIG. 1, the print client 200 may be a notebook computer that directs it print request for a document (hereinafter "document" or "print document").

The print client 200 may include a client processing component 201, a client storage device 202, a print client interface 204, a client input/output (I/O) device 205, and as client wireless transceiver 206. The client processing component 201 may include at least one computer processor that may be utilized to execute computer-readable executable instructions.

The client storage device 202 may be a memory device that may be used to store data. The client storage device 202 may be built into the print client 200, or may be a removable peripheral storage device coupled to the print client 200. The diem storage device 202 may store applications including computer-readable executable instructions that may be executed by a processing component (e.g., client processing component 201). For example, client storage device 202 may store a client-side printing application 203.

The print client 200 may also include the print client interface 204, which may have a display. For example, the print client interface 204 may be a notebook display screen displaying a graphical user interface (GUI)-based Internet browser. The client I/O device 205 (e.g., a mouse, a keyboard) may enable a user to input data or instructions to print client 100. In this embodiment, the client I/O device 205 may be a built-in mouse (e.g., touch pad) located on the print client 200.

The client wireless transceiver 206 may be a transmitter/receiver that may enable the print client 200 to wirelessly communicate with other wirelessly-capable devices. In this embodiment, the print client 200 may utilize client wireless transceiver 206 to communicate with other devices printer 302) via a wireless data connection (e.g., IEEE 802.11, 1999 Edition, LAN/MAN Wireless LAMS (WiFi), IEEE 802.16-2004, LAN/MAN Broadband Wireless LAN S (WiMAX), etc.), a cellular telephone connection (e.g., W-CDMA (UNITS), CDMA2000 (IS-856/IS-2000), etc.), a wired data connection (e.g., RS-232 (Electronic Industries Alliance/Elk), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

The printers 301, 302, may include any device coupled to print client 200 capable of receiving a mint request and executing it hi particular, the printers 301, 302 may include printer processing components 3012, 3022. The printer processing components 3012, 3022 may include at least one computer processor that may be utilized to execute computer-readable executable instructions.

Primers 301, 302 may also include printer storage devices 3011, 3021, respectively, that may store data. For example, the printer storage devices 3011, 3021 may be utilized to store various applications including computer-readable executable instructions that may be executed by the printer processing components 3012, 3022. For example, the printer storage devices 3011, 3021 may store document acquisition drivers 3013, 3023, printer-side printing applications 3014, 3024, and native format drivers 3015, 3025.

As will be discussed in greater detail, once transmitted from the printers 301, 302 and installed on the print client 200, the document acquisition drivers 3013, 3023 may be utilized to generate a print document communication that sends a print document in its native format to the target printer.

Also, as will be discussed in greater detail, the printer-side printing applications 3014, 3024 may generate a return communication to the print client 200 including a document acquisition driver 3013, 3023. In addition, after receiving the print document in native format, the printer-side pinning applications 3014, 3024 may also, among other things, implement native format drivers 3015, 3025 to convert the print document from its native format to a target printer format (e.g., printer control language) that is ready for print execution.

In this embodiment, the printer 301 utilizes a hardwired communication technology to communicate with the print client 200, while the printer 302 may utilize a wireless communication technology. Specifically, the printer 302 may utilize a printer transceiver 3026 to communicate wirelessly via various communication protocols (e.g., near-field communication, Wi-Fi, Bluetooth) with the print client 200. In this embodiment, the printer 302 may communicate with the print client 200 via a Bluetooth protocol.

The printers 301, 302 may be coupled to the network database 400. The network database 400 may be a database that services a network including the print client 200, and may store various drivers, such as a native format driver 401.

The printers 301, 302 may also be coupled to a network such as the Internet 500. The Internet 500 may be used to access a native format driver 601 from a website 600 of an Original Equipment Manufacturer (OEM). The Internet 500 may also be utilized to access the OEM database 700. The OEM database 700 may store various drivers, such as a native format driver 701.

In certain embodiments of the present invention, the website 600 and the OEM database 700 may be part of a cloud service, wherein the cloud, service may be accessed to provide a driver as described herein.

The arrangement and numbering of blocks depicted in FIG. 1 is not intended to imply an order of operations to the exclusion of other possibilities. Those of skill in the art will appreciate that the foregoing systems and methods are susceptible of various modifications and alterations. For example, in another embodiment, the client network 100 may not include the network database 400.

Figure 2:
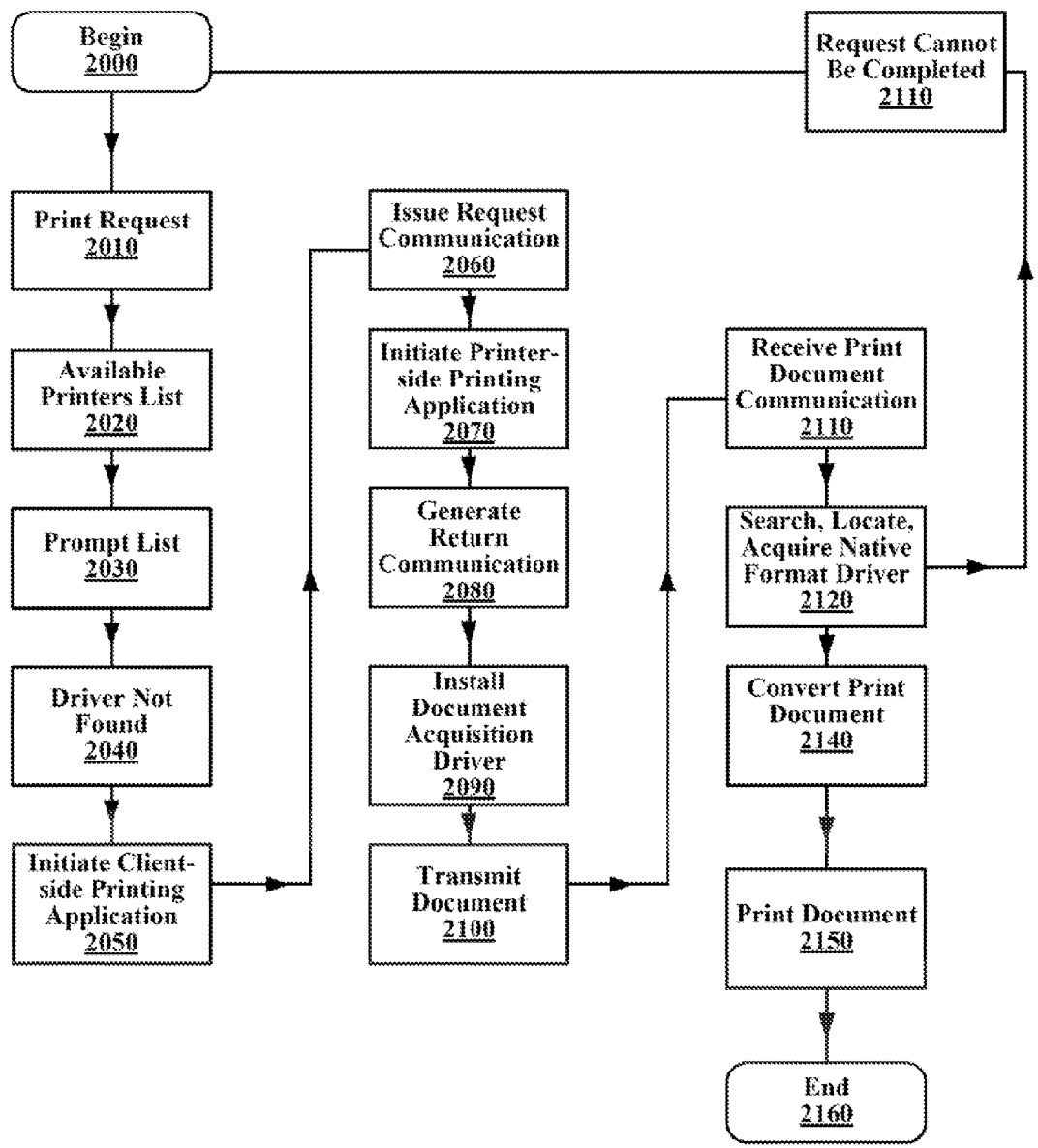
FIG. 2 is a flowchart of an example of a method of utilizing a target printer to acquire a driver to process a print request in accordance with an embodiment of the invention.

Turning now to FIG. 2, a flowchart of an exemplary method of utilizing a target printer to acquire a driver to process a print request according to one embodiment of the present invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

In this embodiment, as user may utilize a print client, such as the print client 200 (FIG. 1), that is located within a network, such as the LAN network 100 (FIG. 1), to direct at print request to a target printer, such as the target printer 302 (FIG. 1). In this embodiment, the print client and the target printer may communicate wirelessly via Bluetooth protocol.

The method begins at processing block 2000. At processing block 2010, the user may initiate the print request through a print client GUI interface, such as the client-side printing application 203 (FIG. 1) discussed above. At processing block 2020, the print client OS may search for and generate a list of available printers. At processing block 2030, the prim client OS may present the user with the list of available printers, and provide a prompt to select the target printer.

After selection of a target printer, at processing block 2040, the print client OS may recognize that the driver for the target printer is not installed on the print client. At processing block 2050, responsive to this recognition, the print client OS may initiate a clientside printing application, such as the client-side priming application 203 (FIG. 1), discussed above. At processing block 2060, the client-side printing application may issue a request communication to the target printer to execute a print request, wherein the request communication may include relevant characteristics of the print client (e.g., OS type, CPU type) and the print document (e.g., print document format) to aid the target printer in completing the print request.

At processing block 2070, responsive to receiving the request communication, the target printer may initiate a printer-side printing application, such as the printer-side printing application 3013 (FIG. 1). At processing block 200, the printer-side printing application may generate a return communication including a document acquisition driver, such as the document acquisition driver 3024 (FIG. 1) discussed above. The return communication may also include a message to the user (e.g., indicating the file should be sent in native format). At processing block 2090, the print client receives the return communication, and the document acquisition driver is installed at the print client. At processing block 2100, the document acquisition driver generates and transmits a print document communication including the print document in native format to the target printer. At processing block 2110, the target printer receives the print document communication.

At processing block 2120, the printer-side printing application may utilize the relevant characteristics included in the print document communication, to search for, locate, and acquire a native format driver. As discussed above, the printer-side printing application may search for the native format driver at, among other places, a printer memory device, such as the printer memory device 3021 (FIG. 1) already discussed, a network database such as the network database 400 (FIG. 1) already discussed, on a website located on the Internet such as Internet 500 (FIG. 1 already discussed, or an OEM database, such as the OEM database 700 (FIG. 1) discussed above, among other places. In this embodiment, the printer-side printing application may locate the native format driver at the printer memory device.

If no native format driver is found, the printer-side printing application may transmit a message to the print client that the print request cannot be completed (at processing block 2130), and the process returns to processing block 2000.

At processing block 2140, upon locating and acquiring the native format driver, the target primer may utilize the native format driver to convert the print document from its native format to the target printer format. At processing block 2150, the target printer may process the print request and may print the document. At processing block 2130, the process may terminate.

It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

For example, in various embodiments of the present invention, the return communication and the searching, locating, and acquiring of the native format driver may be initiated at different points in the process. In the example described above, the return communication including the document acquisition driver (i.e., processing block 2080) is generated before the printer-side printing application searches for, locates, and acquires the native format driver (i.e., processing block 2120). This does not necessarily have to be so. In other embodiments, the return communication including the document acquisition driver and the searching, locating, and acquiring of the native format driver may occur in different order. That is, the target printer may utilize the information received in a request communication (e.g., document format type) to search for, locate, and acquire a native format driver before transmitting the return communication including the document acquisition driver.

Also, in the example described above, the printer may send a document acquisition driver (i.e., processing block 2080), which may be installed at the print client (i.e., processing block 2090), and may transmit a print document communication including the print document in native format to the target printer (i.e., processing block 2100). This does not necessarily have to be so. In other embodiments, the print client may simply transmit the print document directly to the target printer (e.g., in a print message or an email message to the target printer), without the help of a document acquisition driver. The target printer may receive the print document in native, format, and may search for, locate, and acquire a native format driver to convert the print document from its native format to the target printer format for printing.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a limber label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding. Any represented signal lines, whether or not baying additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller sire could be manufactured. In addition, well known power/ground connections and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any typo of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

The terms "update" or "upgrade" may be used herein to refer to any type of installing, securing, or providing an application (e.g., a native format driver) to replace another application, including replacing a current version of the application with a newer or alternate one.

Several features and aspects of embodiments of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

We claim:

1. A method comprising:
   determining, via a print client, that a driver for a target printer is not installed on the print client;
   transmitting, via a client-side printing application, a request communication to the target printer to execute a print request, wherein the request communication includes characteristics of the print client and the print document to aid the target printer in completing the print request, and the characteristics of the print document include a native format;
   transmitting, via the client-side printing application, a print document communication including a print document in a native format to the target printer; and
   conducting, via the target printer, a conversion of the print document from the native format to a target printer format,
   wherein the target printer includes one or more storage devices, and the one or more storages devices stores one or more document acquisition drivers, one or more printer-side printing applications, and one or more native format drivers.

2. The method of claim 1, further including transmitting a return communication including at least one of the one or more document acquisition drivers to the print client.

3. The method of claim 2, further including installing the at least one document acquisition driver on the print client.

4. The method of claim 3, wherein the client-side printing application installs the at least one document acquisition driver.

5. The method claim 4, wherein the at least one document acquisition driver generates the print document communication.

6. The method claim 1, further including:
   locating at least one of the one or more native format drivers; and
   acquiring the at least one native format driver.

7. The method of claim 6, wherein a printer-side printing application locates and acquires the at least one native format driver.

8. The method claim 7, wherein the printer-side printing application locates the at least one native format driver at least one of a printer memory device, a network database, a website, and an OEM database for the at least one native format driver.

9. The method of claim 6, wherein the at least one native format driver converts the print document.

10. A non-transitory computer readable storage medium comprising a set of print client instructions, which, if executed by a processor, cause a computer to:
    determine, via a print client, that a driver for a target printer is not installed on the print client;
    transmit, via a client-side printing application, a request communication to the target printer to execute a print request, wherein the request communication is to include characteristics of the print client and the print document to aid the target printer in completing the print request, and the characteristics of the print document include a native format;
    receive, via the client-side printing application, a return communication including a document acquisition driver to the print client; and
    transmit, via the document acquisition driver, a print document communication including a print document in a native format to the target printer,
    wherein the target printer includes one or more storage devices, and the one or more storages devices is utilized to store one or more document acquisition drivers, one or more printer-side printing applications, and one or more native format drivers.

11. The medium of claim 10, wherein, if executed, the instructions cause a computer to install at least one of the one or more document acquisition drivers on the print client.

12. The medium of claim 11, wherein the client-side printing application installs the at least one document acquisition driver.

13. The medium of claim 12, wherein the at least one document acquisition driver generates the print document communication.

14. The medium of claim 10, wherein the client-side printing application generates the request communication.

15. A non-transitory computer readable storage medium comprising a set of target printer instructions, which, if executed by a processor, cause a computer to:
    receive, via a target printer, a request communication to execute a print request, wherein the request communication is to include characteristics of a print client and a print document to aid the target printer in completing the print request, and the characteristics of the print document include a native format;
    receive, via a printer-side printing application, a print document communication including a print document in a native format; and
    conducting, via the target printer, a conversion of the print document from the native format to a target printer format,
    wherein the target printer includes one or more storage devices, and the one or more storages devices stores one or more document acquisition drivers, one or more printer-side printing applications, and one or more native format drivers.

16. The medium of claim 15, wherein, if executed, the instructions cause a computer to:
    transmit a return communication including at least one of the one or more document acquisition drivers to a print client.

17. The medium of claim 16, wherein the at least one document acquisition driver is configured to generate the print document communication.

18. The medium claim 15, wherein, if executed, the instructions cause a computer to:
    locate at least one of the one or more native format drivers; and
    acquire the at least one native format driver.

19. The medium of claim 18, wherein the printer-side printing application locates and acquires the at least one native format driver.

20. The medium of claim 19, wherein the printer-side printing application locates the at least one native format driver at least one of a printer memory device, a network database, a website, and an OEM database for the at least one native format driver.

21. The medium of claim 18, wherein the at least one native format driver converts the print document.

22. A system comprising:
    a client processing component;
    a client memory device including a client-side printing application having a set of instructions to be executed by the client processing component;

a printer processing component; and a processor memory device including a printer-side printing application having a set of instructions to be executed by the printer processing component, wherein the client-side printing application and the printer-side printing application are configured to:

transfer, in response to a determination that a driver for the target printer is not installed on the print client, a request communication from a print client to a target printer to execute a print request, wherein the request communication is to include characteristics of the print client and the print document to aid the target printer in completing the print request, and the characteristics of the print document include a native format;

transfer a return communication from the target printer to the print client, the return communication to include a document acquisition driver; and transfer a print document communication from the print client to the target printer, the print document communication to include a print document in a native format, wherein the target printer includes one or more storage devices, and the one or more storages devices is utilized to store one or more document acquisition drivers, one or more printer-side printing applications, and one or more native format drivers.

23. The system claim 22, wherein the client-side printing application is configured to install at least one of the one or more document acquisition drivers on the print client.

24. The system of claim 23, wherein the client-side printing application installs the at least one document acquisition driver.

25. The system of claim 24, wherein the at least one document acquisition driver transmits the print document communication.

26. The system of claim 22, wherein the client-side printing application generates the request communication.

27. The system of claim 22, wherein the printer-side printing application is configured to:

locate at least one of the one or more native format drivers; and acquire the at least one native format driver.

28. The system of claim 27, wherein the printer-side printing application locates the at least one native format driver at least one of a printer memory device, a network database, a website, and an OEM database for the at least one native format driver.

29. The system of claim 27, wherein the at least one native format driver converts the print document from the native format to a target printer format.

* * * * *